(12) United States Patent
Liao

(10) Patent No.: US 8,112,124 B2
(45) Date of Patent: Feb. 7, 2012

(54) ELECTRONIC DEVICE AND METHOD FOR RAPIDLY DISPLAYING PICTURES

(75) Inventor: Chien-Liang Liao, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 427 days.

(21) Appl. No.: 12/512,226

(22) Filed: Jul. 30, 2009

(65) Prior Publication Data

US 2010/0035660 A1 Feb. 11, 2010

(30) Foreign Application Priority Data

Aug. 8, 2008 (CN) .......................... 2008 1 0303634

(51) Int. Cl.
*H04M 1/00* (2006.01)

(52) U.S. Cl. .................... 455/566; 455/558; 379/433.09

(58) Field of Classification Search ................ 455/558, 455/407, 412.1, 414.1, 185.1, 186.1, 145, 455/566; 365/185.01, 189.2; 360/78.07; 379/433.09, 88.28, 93.24, 211.05, 284, 285, 379/356.01, 357.02, 357.65
See application file for complete search history.

(56) References Cited

U.S. PATENT DOCUMENTS

| | | | | |
|---|---|---|---|---|
| 5,218,673 A * | 6/1993 | Fujiwara | ...................... | 345/536 |
| 5,276,805 A * | 1/1994 | Hamaguchi | ................... | 345/537 |
| 5,497,193 A * | 3/1996 | Mitsuhashi et al. | ..... | 348/231.99 |
| 5,508,820 A * | 4/1996 | Kabeya | ......................... | 358/404 |
| 6,081,208 A * | 6/2000 | Kikuchi et al. | ................. | 341/50 |
| 6,353,655 B1 * | 3/2002 | Siochi | ............................ | 378/65 |
| 7,092,742 B2 * | 8/2006 | Rytivaara et al. | ............. | 455/566 |
| 7,457,951 B1 * | 11/2008 | Proudler et al. | .............. | 713/164 |
| 7,724,288 B2 * | 5/2010 | Fredlund et al. | ........... | 348/231.2 |
| 7,894,707 B2 * | 2/2011 | Nakajima | ..................... | 386/224 |
| 2005/0038960 A1 * | 2/2005 | Himmel et al. | ............... | 711/115 |
| 2005/0286777 A1 * | 12/2005 | Kumar et al. | .................. | 382/232 |
| 2007/0065098 A1 * | 3/2007 | Abe et al. | ........................ | 386/68 |
| 2008/0065718 A1 * | 3/2008 | Todd et al. | ..................... | 709/203 |
| 2008/0069407 A1 * | 3/2008 | Kocher | .......................... | 382/115 |
| 2008/0069440 A1 * | 3/2008 | Forutanpour | ................. | 382/163 |
| 2009/0006855 A1 * | 1/2009 | Tuyls et al. | .................... | 713/182 |
| 2010/0066508 A1 * | 3/2010 | Jokinen et al. | .............. | 340/10.5 |

\* cited by examiner

*Primary Examiner* — Dominic E Rego

(74) *Attorney, Agent, or Firm* — Altis Law Group, Inc.

(57) ABSTRACT

A method for rapidly displaying pictures on an electronic device receives an identifier of a picture to be displayed. If processed data of the picture exists in a second memory of the electronic device, the processed data is retrieved from the second memory, and the picture is displayed. Otherwise, if processed data of the picture does not exist in the second memory, raw data of the picture is retrieved from a first memory of the electronic device, and the processed data is generated by encoding the raw data. The generated processed data are stored and the picture is displayed.

18 Claims, 5 Drawing Sheets

ELECTRONIC DEVICE AND METHOD FOR RAPIDLY DISPLAYING PICTURES

BACKGROUND

1. Technical Field

Embodiments of the present disclosure relate to displaying pictures, and particularly to an electronic device and method for rapidly displaying pictures.

2. Description of Related Art

Electronic devices, such as mobile phones, are increasingly equipped with more and more functions. As a result, more and more menu options are provided in the electronic devices.

There may be multiple menu options in a program menu. For example, a shortcut menu of a mobile phone may comprise menu options, such as "Alarm," "Calendar," "File Manager," "Timer," "Calculator," "Tasks," "Notes," "Music Player," and "Camera." Due to a finite size of a display screen, the mobile phone can display finite menu options, thus forcing a user to scroll up/down the menu to view desired menu options. For example, the menu options "Alarm," "Calendar," "File Manager," "Timer," "Calculator," and "Tasks" are shown firstly. After the user scrolls down the shortcut menu, the menu options "Calendar," "File Manager," "Timer," "Calculator," "Tasks," and "Notes" are shown later. Some same menu options, such as the menu options "Calendar," "File Manager," and "Timer" are repeatedly displayed.

In addition, each menu option may be represented as a menu option icon (which is a picture). Each time a menu option is displayed, a corresponding menu option icon is decoded and shown. For example, menu option icons of the menu options "Alarm," "Calendar," "File Manager," "Timer," "Calculator," and "Tasks" are decoded in the first display. Menu option icons of the menu options "Calendar," "File Manager," "Timer," "Calculator," "Tasks," and "Notes" are decoded in the second display. It is obvious that the menu option icons of the menu options "Calendar," "File Manager," "Timer," "Calculator," and "Tasks" are repeatedly decoded. The decoding process is a somewhat time-consuming process, especially for low-end electronic devices. If a picture is repeatedly displayed and decoded each time, it may cause a slow display to the user.

DETAILED DESCRIPTION

All of the processes described below may be embodied in, and fully automated via, functional code modules executed by one or more general purpose processors of an electronic device. The code modules may be stored in any type of storage medium. Some or all of the methods may alternatively be embodied in specialized hardware.

Figure 1:
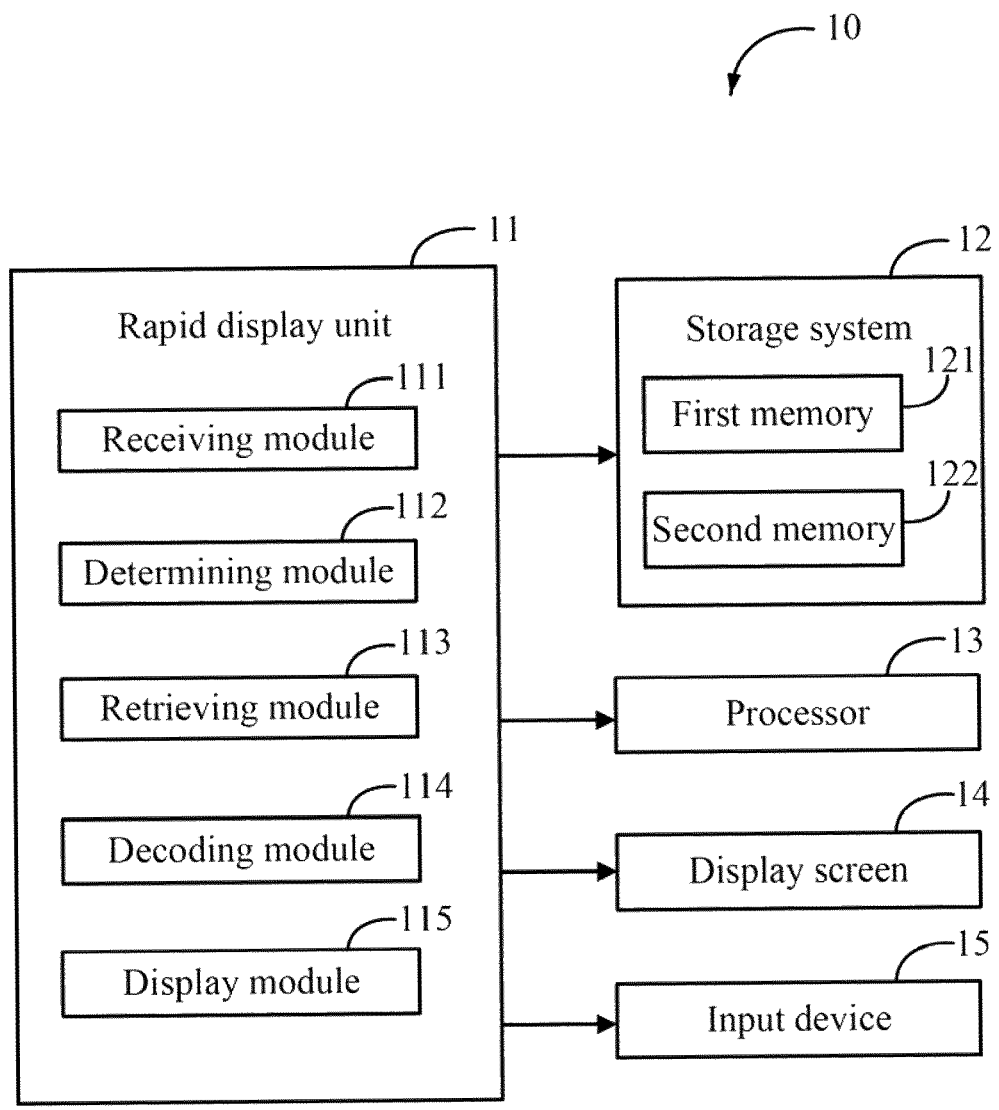
FIG. 1 is a block diagram of one embodiment of an electronic device for rapidly displaying pictures.

FIG. 1 is a block diagram of one embodiment of an electronic device 10. The electronic device 10 may reduce repeated decoding of pictures so as to rapidly display the pictures on a display screen 14 of the electronic device 10. The electronic device 10 may be a mobile phone or a personal digital assistant (PDA). In one embodiment, the electronic device 10 may include a rapid display unit 11, a storage system 12, a processor 13, the display screen 14, and an input device 15. One or more computerized codes of the rapid display unit 11 may be stored in the storage system 12 and executed by the processor 13. The pictures may be any type of pictures that need to be encoded while being displayed.

It may be understood that different data formats may be used to characterize a picture. The electronic device 10 may store raw data for all the pictures. The raw data cannot be directly used to display the pictures. The electronic device 10 may decode raw data of a picture into processed data when displaying the picture. However, the decoding process may be time-consuming. In one embodiment, raw data may be in the portable network graphic (PNG) format, whereas the processed data may be in the bitmap (BMP) format.

In one embodiment, the storage system 12 includes a first memory 121 that stores the raw data of the pictures. The storage system 12 further includes a second memory 122 that stores processed data of pictures that have been displayed on the display screen 14. The first memory 121 may be an external memory, such as a smart media card (SMC), a secure digital card (SDC), a compact flash card (CFC), a multi media card (MMC), a memory system stick (MS), an extreme digital card (XDC), and a trans flash card (TFC). The second memory 122 may be an internal memory, such as a cache memory of the electronic device 10.

Figure 2:
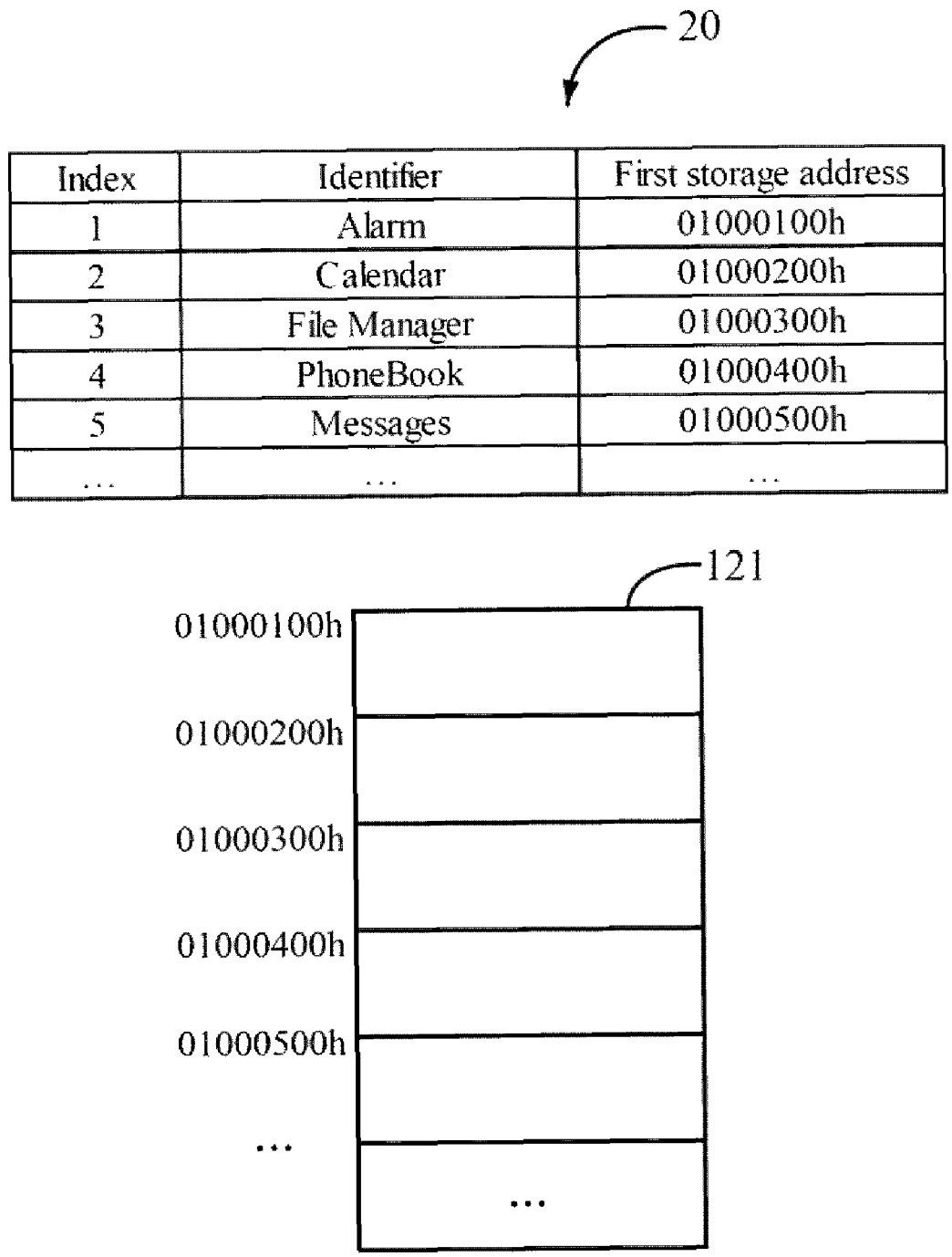
FIG. 2 illustrates one embodiment of a first record list 20.
Figure 3:
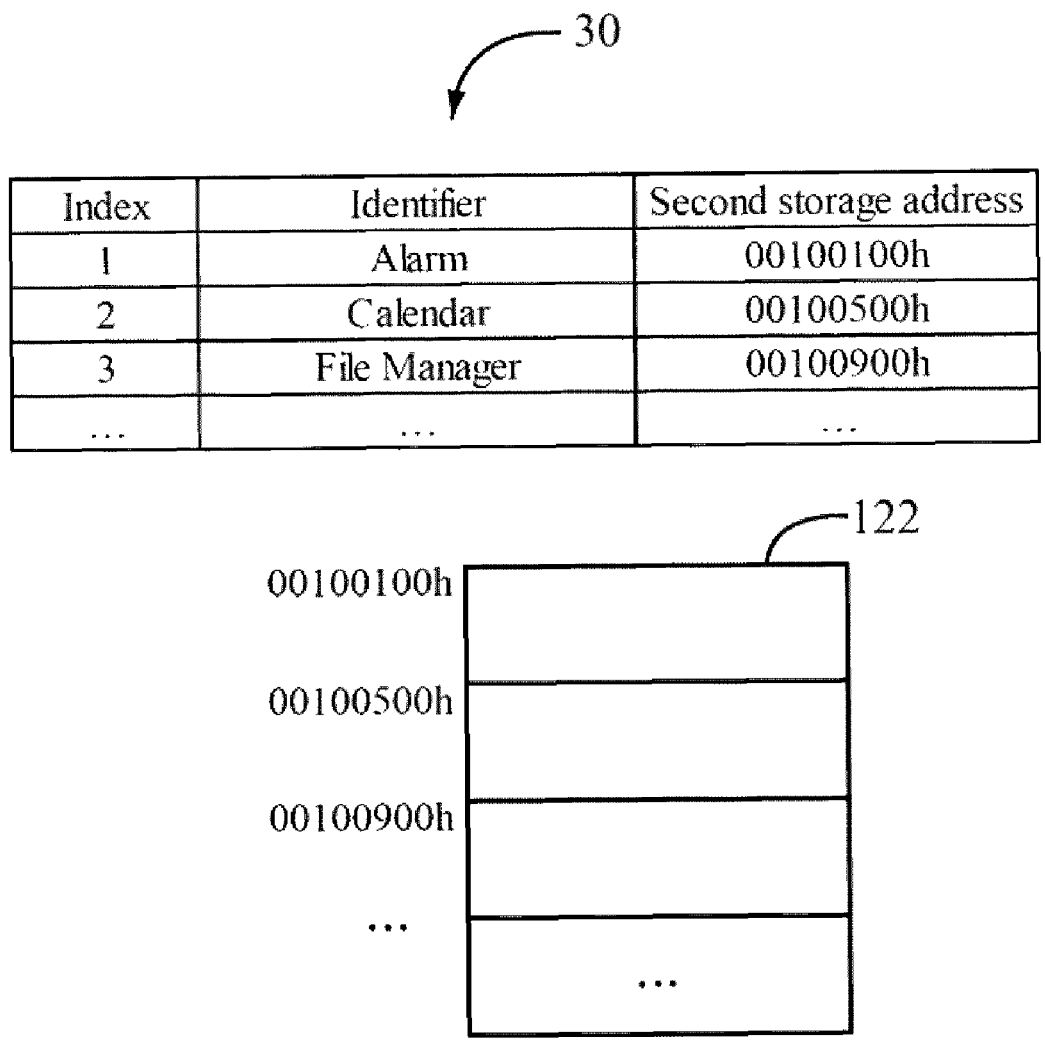
FIG. 3 illustrates one embodiment of a second record list 30.

In one embodiment, the first memory 121 may store the raw data using a first record list 20 (shown in FIG. 2). Each record in the first record list 20 may include an identifier of a picture and a first storage address pointing to the raw data of the picture. It may be understood that each identifier, such as a picture name, uniquely identifies a picture. Similarly, the second memory 122 may store the processed data using a second record list 30 (shown in FIG. 3). Each record in the second list 30 may include an identifier of a picture and a second storage address pointing to processed data of the picture. Therefore, raw data of a picture may be retrieved from the first memory 121 according to the identifier of the picture. Likewise, if processed data of a picture exists in the second memory 122, the processed data of the picture may be retrieved from the second memory 122 according to the identifier of the picture. As mentioned above, the first memory 121 may be an external memory, and the second memory 122 may be an internal memory. Therefore, accessing data from the second memory 122 may be rapider than from the first memory 121.

The rapid display unit 11 may include a receiving module 111, a determining module 112, a retrieving module 113, a decoding module 114, and a display module 115.

The receiving module 111 is operable to receive an identifier of a picture to be displayed from the input device 15, such as a touch screen or a keypad.

The determining module 112 is operable to determine whether processed data of the picture exists in the second memory 122 according to the identifier of the picture.

The retrieving module 113 is operable to retrieve the processed data of the picture that exists in the second memory 122 from the second memory 122.

The decoding module 114 is operable to retrieve the raw data of the picture that does not exist in the second memory 122 from the first memory 121. The decoding module 114 may generate processed data of the picture by decoding the raw data. The decoding module 114 further stores the generated processed data into the second memory 122. As such, the processed data of the picture can be directly retrieved from the second memory 122 the next time the picture is to be displayed.

The display module 115 is operable to display the picture on the display screen 14 according the processed data of the picture.

Figure 4:
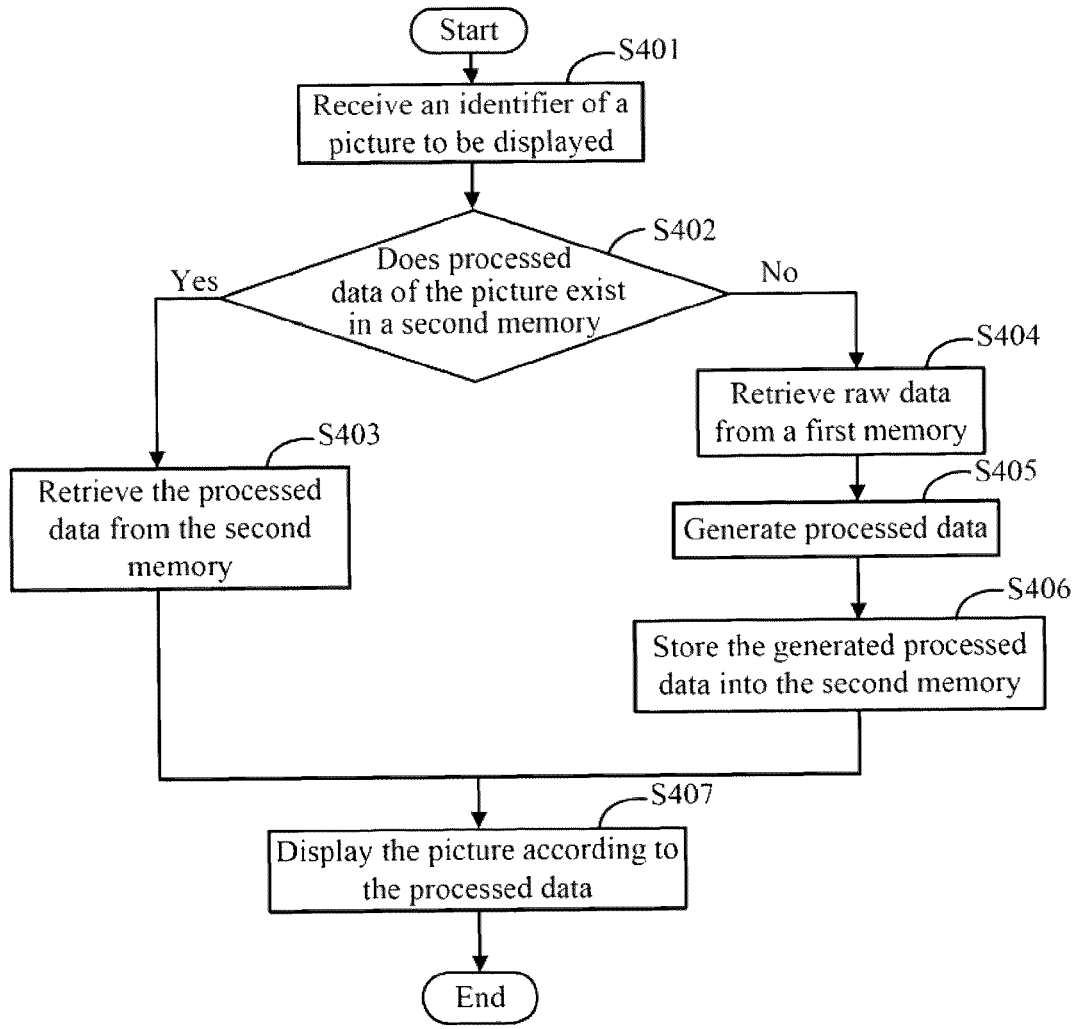
FIG. 4 is a flowchart of one embodiment of a method for rapidly displaying pictures on an electronic device.

FIG. 4 is a flowchart of one embodiment of a method for rapidly displaying pictures on the electronic device 10 of FIG. 1. The method may reduce repeated decoding of the pictures so as to rapidly display the pictures. Depending on the embodiments, additional blocks may be added, others removed, and the ordering of the blocks may be changed.

In block 401, the receiving module 111 receives an identifier of a picture to be displayed from the output device 15. Depending on the embodiment, the receiving module 111 may receive more than one identifier from the output device 15. Each identifier corresponds to a picture to be displayed. In one example, the receiving module 111 receives six identifiers corresponding to pictures "A," "B," "C," "D," "E," and "F."

In block 402, the determining module 112 determines whether processed data of the picture exists in the second memory 122 according to the identifier. As mentioned above, the second memory 12s may store processed data using a second record list 30 (shown in FIG. 3). Each record in the second list may include an identifier of a picture and a second storage address pointing to the processed data of the picture. Accordingly, the determining module 112 may determine whether there is a record in the second record list 30 that matches the received identifier. If there is a record in the second record list 30 that matches the received identifier, the processed data of the picture exists in the second memory 122. In one example, the pictures "A," "B," "C," "D," and "E" have been displayed and exist in the second memory 122. The picture "F" does not exist in the second memory 122.

If processed data of the picture exists in the second memory 122, in block 403, the retrieving module 113 retrieves the processed data of the picture from the second memory 122. In one embodiment, the retrieving module 113 determines a second storage address pointing to the decoded information of the picture, and retrieves the processed data from the second memory 122 according to the second storage address. In one example, the retrieving module 113 retrieves the processed data of the pictures "A," "B," "C," "D," and "E" from the second memory 122.

If processed data of the picture does not exist in the second memory 122, in block 404, the decoding module 114 retrieves raw data of the picture from the first memory 121 according to the identifier of the picture. As mentioned above, the first memory 121 may store the raw data using a first record list 20 (shown in FIG. 2). Each record in the first record list 20 may include an identifier of a picture and a first storage address pointing to raw data of the picture. Accordingly, the decoding module 114 retrieves the raw data of the picture from the first memory 121 according to the first storage address. In one example, the decoding module 114 retrieves raw data of the picture "F" from the first memory 121.

In block 405, the decoding module 114 generates processed data of the picture by decoding the raw data. In one example, the decoding module 114 generates processed data of the picture "F."

In block 406, the decoding module 114 stores the generated processed data into the second memory 122. For example, the generated processed data of the picture "F" are stored into the second memory 122. As such, the processed data of the picture can be directly retrieved from the second memory 122 next time the picture need displaying. In one example, the second memory 122 may possess a storage space of 256 KB. The second memory 122 may store the processed data using a first-in first-out (FIFO) queue.

In block 407, the display module 115 display the picture on the display screen 14 according to the processed data of the picture. In one example, the display module 115 displays the pictures "A," "B," "C," "D," "E," and "F" on the display screen 14.

Figure 5:
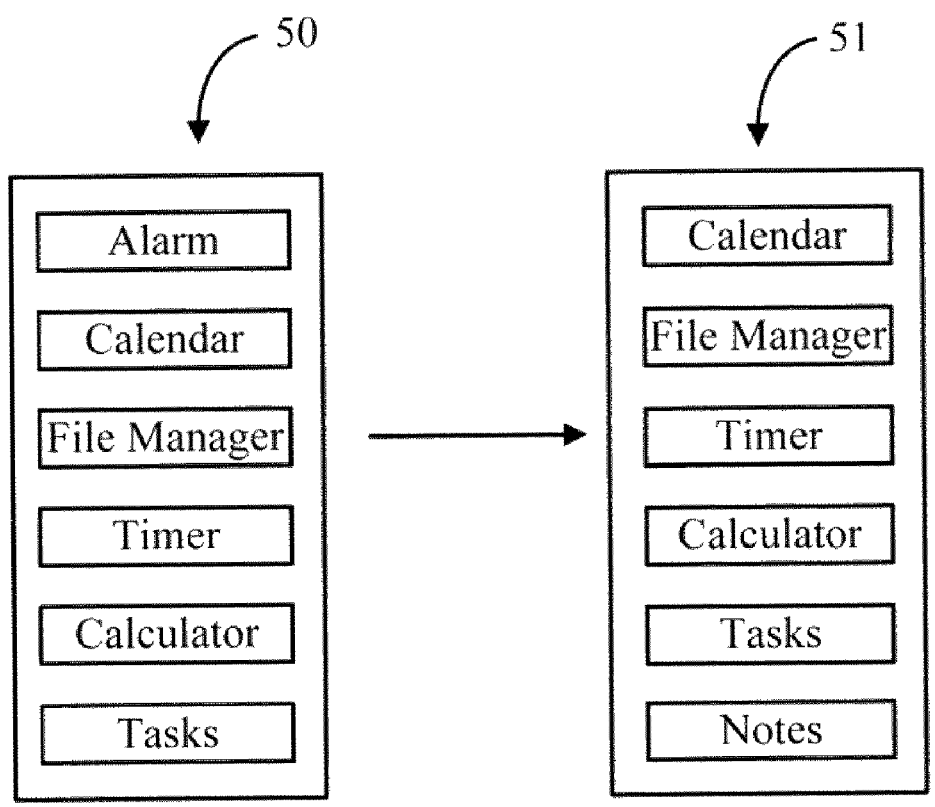
FIG. 5 illustrates one embodiment of displaying menu option icons of a program menu.

FIG. 5 illustrates one embodiment of displaying menu option icons of a program menu. Six menu option icons of the program menu may be displayed in the display screen 14 each time. It may be understood that the menu option icons may be encoded as a picture. At a first display 50, raw data of menu option icons "Alarm," "Calendar," "File Manager," "Timer," "Calculator," and "Tasks" are decoded into processed data. The processed data are stored into the second memory 122. At a second display 51, the processed data of the menu option icons "Calendar," "File Manager," "Timer," "Calculator," and "Tasks" are retrieved from the second memory 122. Therefore, the menu option icons "Calendar," "File Manager," "Timer," "Calculator," "Tasks," and "Notes" are displayed rapidly at the second display.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. An electronic device for rapidly displaying pictures, the electronic device comprising:
   a display screen;
   a storage system comprising a first memory and a second memory, wherein the first memory stores raw data of pictures, the second memory stores processed data of pictures that have been displayed on the display screen;
   at least one processor; and
   a rapid display unit stored in the storage system and being executable by the at least one processor, the rapid display unit comprising:
   a receiving module to receive an identifier of a picture to be displayed on the display screen, the identifier received from an input device of the electronic device;
   a determining module to determine if processed data of the picture exists in the second memory according to the identifier;
   a retrieving module to retrieve the processed data of the picture from the second memory if the processed data of the picture exists in the second memory;
   a decoding module to retrieve raw data of the picture from the first memory if processed data of the picture does not exist in the second memory, generate the processed data of the picture by decoding the retrieved raw data, and store the generated processed data into the second memory; and
   a display module to display the picture on the display screen according to the processed data.

2. The electronic device of claim 1, wherein the electronic device is a mobile phone or a personal digital assistant.

3. The electronic device of claim 1, wherein the input device is a touch screen or a keypad.

4. The electronic device of claim 1, wherein the second memory stores the processed data using a first-in first-out queue.

5. The electronic device of claim 1, wherein the raw data are in the portable network graphic (PNG) format.

6. The electronic device of claim 1, wherein the processed data are in the bitmap (BMP) format.

7. A method for rapidly displaying pictures on an electronic device, the method comprising:
- receiving an identifier of a picture to be displayed on a display screen of the electronic device, the identifier received from an input device of the electronic device;
- determining if processed data of the picture exists in a second memory of the electronic device according to the identifier;
- retrieving the processed data of the picture from the second memory if the processed data of the picture exists in the second memory; or
- retrieving raw data of the picture from a first memory of the electronic device if the processed data of the picture does not exist in the second memory, generating the processed data of the picture by decoding the retrieved raw data, and storing the generated processed data into the second memory; and
- displaying the picture on a display screen of the electronic device according to the processed data.

8. The method of claim 7, wherein the electronic device is a mobile phone or a personal digital assistant.

9. The method of claim 7, wherein the input device is a touch screen or a keypad.

10. The method of claim 7, wherein the second memory stores the processed data using a first-in first-out queue.

11. The method of claim 7, wherein the raw data are in the portable network graphic (PNG) format.

12. The method of claim 7, wherein the processed data are in the bitmap (BMP) format.

13. A storage medium having stored thereon instructions that, when executed by an electronic device, cause the electronic device to execute a method for rapidly displaying pictures, the method comprising:
- receiving an identifier of a picture to be displayed on a display screen of the electronic device, the identifier received from an input device of the electronic device;
- determining if processed data of the picture exists in a second memory of the electronic device according to the identifier;
- retrieving the processed data of the picture from the second memory if the processed data of the picture exists in the second memory; or
- retrieving raw data of the picture from a first memory of the electronic device if the processed data of the picture does not exist in the second memory, generating the processed data of the picture by decoding the retrieved raw data, and storing the generated processed data into the second memory; and
- displaying the picture on a display screen of the electronic device according to the processed data.

14. The storage medium of claim 13, wherein the electronic device is a mobile phone or a personal digital assistant.

15. The storage medium of claim 13, wherein the input device is a touch screen of a keypad.

16. The storage medium of claim 13, wherein the second memory stores the processed data using a first-in first-out queue.

17. The storage medium of claim 13, wherein the raw data are in the portable network graphic (PNG) format.

18. The storage medium of claim 13, wherein the processed data are in the bitmap (BMP) format.

* * * * *